United States Patent
Harutyunyan

(10) Patent No.: US 11,629,417 B2
(45) Date of Patent: Apr. 18, 2023

(54) NOBLE METAL FREE CATALYST FOR HYDROGEN GENERATION

(71) Applicant: Honda Motor Co., Ltd., Tokyo (JP)

(72) Inventor: Avetik Harutyunyan, Santa Clara, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 16/817,285

(22) Filed: Mar. 12, 2020

(65) Prior Publication Data

US 2021/0285116 A1 Sep. 16, 2021

(51) Int. Cl.
| | |
|---|---|
| C25B 11/051 | (2021.01) |
| C25B 1/04 | (2021.01) |
| C25B 11/031 | (2021.01) |
| C25B 11/057 | (2021.01) |
| C25B 11/075 | (2021.01) |
| C25B 11/061 | (2021.01) |

(52) U.S. Cl.
CPC ............. *C25B 11/051* (2021.01); *C25B 1/04* (2013.01); *C25B 11/031* (2021.01); *C25B 11/057* (2021.01); *C25B 11/061* (2021.01); *C25B 11/075* (2021.01)

(58) Field of Classification Search
CPC ................. C25B 11/04–11/097; B01J 21/18
See application file for complete search history.

(56) References Cited

U.S. PATENT DOCUMENTS

| | | |
|---|---|---|
| 9,236,197 B2 | 1/2016 | Dai et al. |
| 9,237,658 B2 | 1/2016 | Dai et al. |
| 2011/0008707 A1 | 1/2011 | Muraoka et al. |
| 2012/0088039 A1* | 4/2012 | Yu ........................ C01B 32/186 427/596 |
| 2013/0189580 A1 | 7/2013 | Dai et al. |
| 2015/0129431 A1 | 5/2015 | Winther-Jensen et al. |
| 2015/0167185 A1 | 6/2015 | Winther-Jensen et al. |
| 2016/0268061 A1 | 9/2016 | Wang et al. |
| 2016/0326031 A1 | 11/2016 | Amy et al. |
| 2017/0283259 A1 | 10/2017 | Yu et al. |

(Continued)

FOREIGN PATENT DOCUMENTS

| | | |
|---|---|---|
| CN | 104810526 A | 7/2015 |
| CN | 1055262005 A | 5/2016 |

(Continued)

OTHER PUBLICATIONS

Ito et al ("Cooperation between holey graphene and NiMo alloy for hydrogen evolution in an acidic electrolyte", ACS Catalysis, 8, 2018, p. 3579-3586). (Year: 2018).*

(Continued)

*Primary Examiner* — Alexander W Keeling

(74) *Attorney, Agent, or Firm* — ArentFox Schiff LLP; Mark Duell

(57) ABSTRACT

A method for generating hydrogen including contacting a catalyst with a proton source, the catalyst having a catalytic component with a first surface comprising a plurality of catalytic sites and a carbon component provided as a layer on the first surface, wherein the carbon component comprises a plurality of pores. Also provided are catalysts for catalyzing the hydrogen evolution reaction and methods of making the same.

12 Claims, 2 Drawing Sheets

(56) References Cited

U.S. PATENT DOCUMENTS

2017/0309362 A1 10/2017 LIU et al.
2018/0043339 A1 2/2018 Noda et al.

FOREIGN PATENT DOCUMENTS

| CN | 106076383 A | 11/2016 |
| --- | --- | --- |
| CN | 106881091 A | 6/2017 |
| CN | 106944065 A | 7/2017 |
| EP | 2560754 A1 | 2/2013 |
| JP | 2017197424 A | 11/2017 |
| KR | 1020160112632 A | 9/2016 |
| WO | WO 2015/069227 A1 | 5/2015 |
| WO | WO 2016/140227 A1 | 9/2016 |

OTHER PUBLICATIONS

Dahal et al ("Graphene-nickel interfaces: a review", Nanoscale, 2014, 6, p. 2548-2562 (Year: 2014).*

Vanin et al ("Graphene on metals: A van der Waals density functional study", Physical Review B, 81, 2010, pp. 081408-1-081408-4) (Year: 2010).*

Israelchivili ("The Nature of van der Waals Forces", Contemporary Physics, vol. 15, 1974—Issue 2, pp. 159-177) (Year: 1974).*

Lu et al ("Metal Nickel Foam as an Efficient and Stable Electrode for Hydrogen Evolution Reaction in Acidic Electrolyte under Reasonable Overpotentials", Applied Materials & Interfaces, 2016, 8, pp. 5065-5069 (Year: 2016).*

Lokhande et al ("Holey graphene: an emerging versatile material", Journal of Materials Chemistry A, Nov. 2019, 8, pp. 918-977). (Year: 2019).*

Casey, T., "Graphene Could Lower the Cost of Renewable Hydrogen For FCEVs", https://cleantechnica.com/2015/10/23/graphene-lower-cost-renewable-hydrogen-fcevs/. Clean Technica (2015).

Gong, M., et al., "Amini Review on Nickel-Based Electrocatalysts for Alkaline Hydrogen Evolution Reaction", ISSN 1998-0124, Nano Research DOI 10.1007/s12274-015-0965-x (1998).

Popczun, E., et al., "Nickel Phosphide Nanoparticle Shown to be Effecient Non-Noble Metal Electrocatalyst for Hydrogen Production", Journal of the American Chemical Society doi: 10.1021/ja403440e, Hydrogen Production, Nanotech, Jun. 17, 2013.

Shi, Y., et al., "Recent Advances in Transition Metal Phosphide Nanomaterials: Synthesis and Applications in Hydrogen Evolution Reaction", Royal Society of Chemistry, published Jan. 25, 2016.

* cited by examiner

NOBLE METAL FREE CATALYST FOR HYDROGEN GENERATION

TECHNICAL FIELD

The present disclosure is directed to a method of hydrogen generation via the hydrogen evolution reaction and catalysts useful for the same.

BACKGROUND OF THE DISCLOSURE

Hydrogen is a promising candidate for an environmentally-friendly fuel option with various potential applications. Methods for producing hydrogen have therefore generated considerable interest. However, many materials currently used to catalyze the hydrogen evolution reaction, such as noble metals, are expensive and/or provide an unacceptably low catalytic efficiency. There is thus a need in the art for methods of hydrogen generation via the hydrogen evolution reaction, and in particular, new catalysts capable of catalyzing such reactions.

BRIEF DESCRIPTION OF THE DISCLOSURE

The present disclosure is directed to a method of generating hydrogen, and in particular, to a method of hydrogen generation via the hydrogen evolution reaction (HER). The method comprises providing a catalyst for hydrogen generation, the catalyst comprising a catalytic component and a carbon component having a plurality of pores. The method may comprise contacting the catalyst with a proton source such that protons traverse the plurality of pores and adsorb to the catalytic component, wherein at least a portion of the protons take part in the HER. The present disclosure is also directed to a catalyst as described herein as well as methods of making the same.

DETAILED DESCRIPTION OF THE DISCLOSURE

Figure 1A:
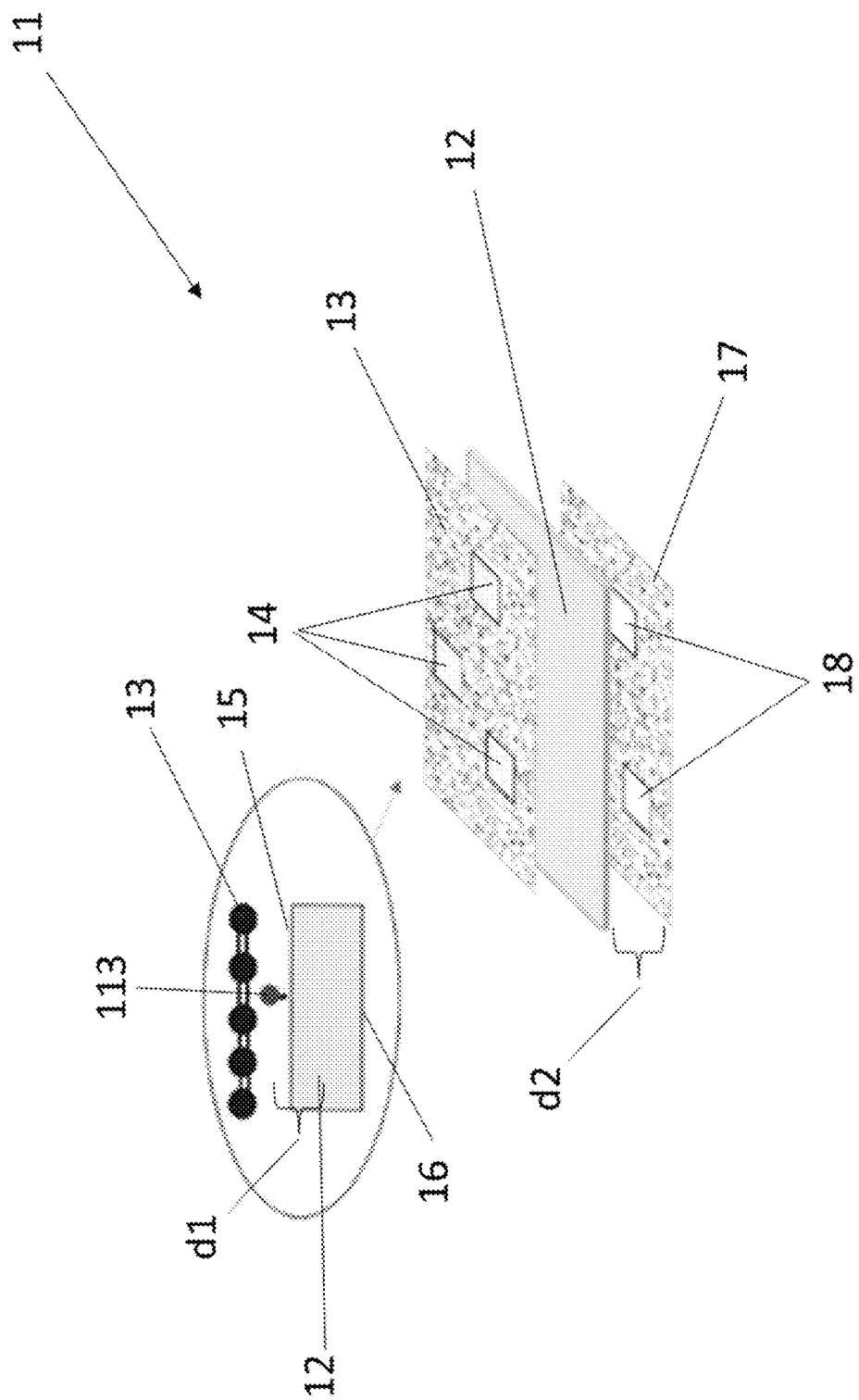
FIG. 1A shows an example catalyst according to aspects of the present disclosure.

The present disclosure is directed to a method of generating hydrogen, and in particular, a method of hydrogen generation via the HER. The method comprises providing a catalyst for hydrogen generation, the catalyst comprising a catalytic component and a carbon component having a plurality of pores. The method may comprise contacting the catalyst with a proton source such that protons traverse the plurality of pores and adsorb to the catalytic component, wherein at least a portion of the protons take part in the HER. The present disclosure is also directed to a catalyst as described herein as well as methods of making the same.

As used herein, the term "hydrogen evolution reaction" or "HER" refers to a chemical reaction that produces hydrogen. It should be understood that "hydrogen" may refer to atomic hydrogen (H), that is, an atom having one proton and one electron. Alternatively or additionally, "hydrogen" may refer to molecular hydrogen ($H_2$), that is, a diatomic molecule having two protons and two electrons.

The method comprises providing a catalyst configured to catalyze the HER, the catalyst comprising a catalytic component and a carbon component. The catalytic component may comprise a catalytic material. As used herein, the term "catalytic material" refers to a material capable of catalyzing the HER, and in particular, a material having one or more catalytic sites configured for proton adsorption thereto. According to some aspects, the catalytic material may comprise an electrode material, that is, a material capable of conducting electrical charge. Examples of catalytic materials useful according to the present disclosure include, but are not limited to, metals such as nickel (Ni), platinum (Pt), alloys thereof, and combinations thereof. According to some aspects, the catalytic material is free of noble metals.

The catalytic component may be provided in any form capable of catalyzing the HER as disclosed herein. For example, the catalytic component may be provided as a particle (such as a nanoparticle), a sheet (such as a metal foil), porous surfaces, or any combination thereof. It should be understood that the catalytic component should have a form such that at least a first surface containing catalytic sites is provided.

The catalyst also comprises a carbon component. Examples of carbon components useful according to the present disclosure include, but are not limited to, graphene, including monolayer graphene, bilayer graphene, and multi-layer graphene. However, it should be understood that any carbon component may be used so long as it enables the passage of protons therethrough, as describe herein. According to some aspects, the carbon component may be provided as a layer on at least one surface of the catalytic component, and in particular, on the at least first surface of the catalytic component containing the catalytic sites, as described herein.

The carbon component as described herein comprises a plurality of pores.

As used herein, the term "pore" refers to an opening extending completely through a material. For example, according to some aspects of the present disclosure, a "pore" may corresponding to an opening formed by a discontinuous surface, for example, a discontinuous layer of graphene. It should be understood that in some examples, the plurality of pores may be provided by a carbon component that does not completely cover the catalytic component. For example, in the case where the carbon component is provided as discrete islands on the catalytic component, the plurality of pores may refer to the space between the islands.

The plurality of pores may be provided proximal to the at least first surface of the catalytic component, wherein at least a portion of the plurality of pores are sized so as to enable the passage of protons therethrough, and thus, through the carbon component. According to some aspects, the carbon component may be provided on the at least first surface of the catalytic component such that coverage of the first surface of the catalytic component is less than about 1 L of Langmuir, also referred to herein as "sub-coverage." In this example, the carbon component will enable the passage of protons to the at least first surface of the catalytic component where the carbon component does not cover the catalytic component.

FIG. 1 shows two example catalyst configurations according to aspects of the present disclosure.

In particular, FIG. 1A shows a catalyst 11 having a catalytic component 12 and a first layer of carbon component 13. As shown in FIG. 1A, the catalytic component 12 may be provided in the form of a foil having a first surface 15 proximal the first layer of carbon component 13. The first layer of carbon component 13 may have a plurality of pores 14 proximal the first surface 15 of the carbon component 13, the plurality of pores 14 being sized so as to enable passage of protons through the first layer of carbon component 13. As described herein, the first surface 15 of the catalytic component 12 may be provided with one or more catalytic sites capable of adsorbing protons thereto, as described herein.

As shown in FIG. 1A, the catalytic component 12 may have a second surface 16 also having one or more catalytic sites as described herein. The second surface 16 may be proximal a second layer of carbon component 17 having a plurality of pores 18 as described herein.

Figure 1B:
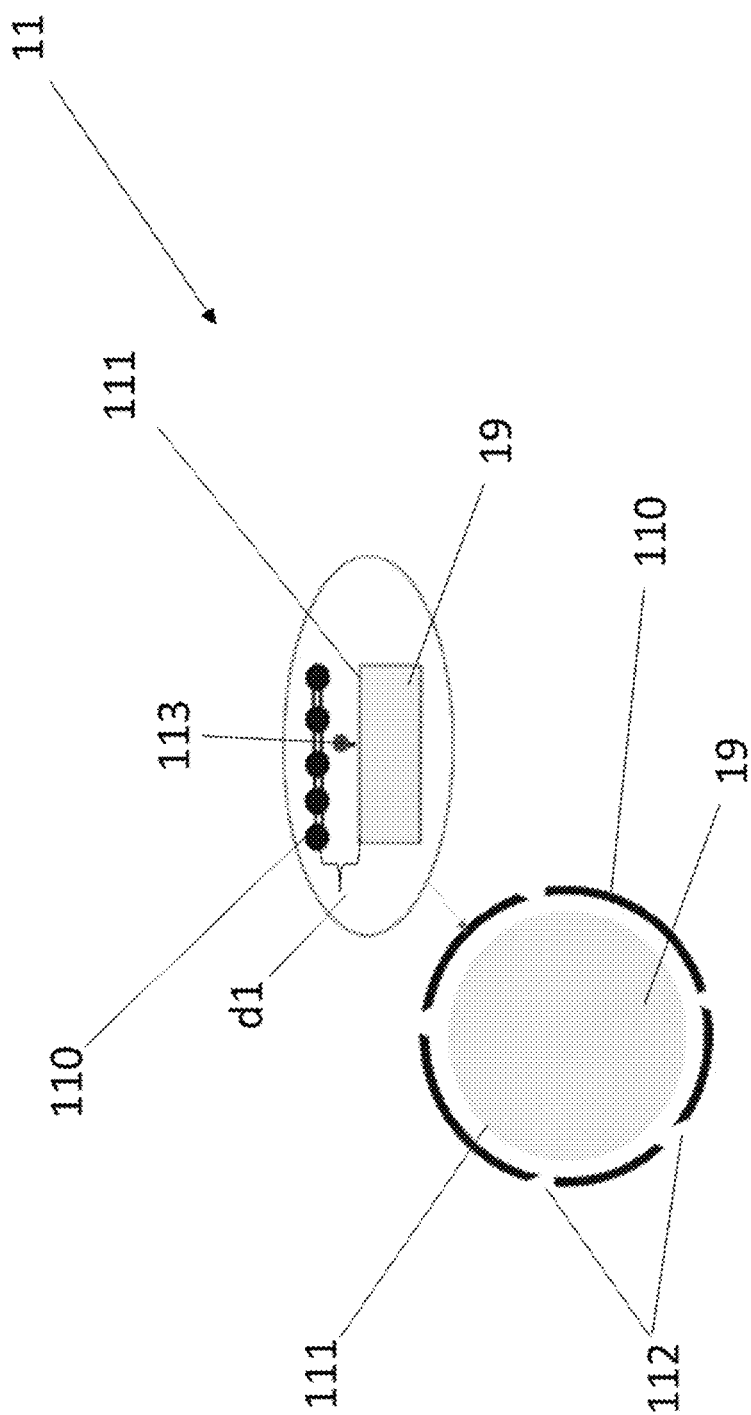
FIG. 1B shows an example catalyst according to aspects of the present disclosure.

FIG. 1B shows another example catalyst configuration as described herein.

In particular, FIG. 1B shows a catalyst 11 having a catalytic component 19 and a first layer of carbon component 110. As shown in FIG. 1B, the catalytic component 19 may be provided in the form of a particle having a first surface 111 proximal the first layer of carbon component 110. As described herein, the first surface 111 of the catalytic component 19 may be provided with one or more catalytic sites. Similar to the catalyst shown in FIG. 1A, FIG. 1B shows the first layer of carbon component 110 having a plurality of pores 112 being sized so as to enable the passage of protons through the first layer of carbon component 110.

It should be understood that each pore of the plurality of pores will provide a pathway from an outer surface of the catalyst (i.e., the surface of the carbon component opposite the catalytic component) to the surface of the carbon component proximal the catalytic component. According to some aspects, the pathway may be substantially straight, which in this context, may mean a pathway that spans from the outer surface of the catalyst to the surface of the carbon component proximal the catalytic component without curves, bends, etc.

It should be understood that the surface area of the first surface provided with the carbon component will not be completely covered by the carbon component due to the presence of the plurality of pores. That is, the plurality of pores will expose at least a portion of the surface area of the first surface provided with the carbon component. According to some aspects, the plurality of pores may expose at least about 10% of the surface area of the first surface provided with the carbon component, optionally at least about 20%, optionally at least about 30%, optionally at least about 40%, optionally at least about 50%, optionally at least about 60%, optionally at least about 70%, optionally at least about 80%, optionally at least about 90%. According to some aspects, the percent of the surface area of the first surface covered by the carbon component (referred to herein as the degree of coverage) may correspond with, for example, the carbon component growth conditions, including, but not limited to, growth time, rate of carbon source introduction, growth temperature, or a combination thereof. According to some aspects, the carbon component may be provided on at least about 50% of the surface area of the first surface of the catalytic component (i.e., a degree of coverage of about 50%), optionally at least about 60%, optionally at least about 70%, optionally at least about 80%, optionally at least about 90%, optionally at least about 95%, and optionally about 100%. According to some aspects, the degree of coverage of the carbon coating on the first surface of the catalytic component may be less than 1 L of Langmuir.

As shown in FIGS. 1A and 1B, at least the first layer of carbon component 13, 110 may be provided a certain distance d1 from the first surface 15, 111 of the catalytic component 12, 19. According to some aspects, distance d1 may be sized so as to enable the presence and/or passage of hydrogen 113 in the space between the carbon component 13, 110 and the catalytic component 12, 19. For example, distance d1 may be sized such that hydrogen 113 is able diffuse from the first surface 15, 111 of the catalytic component 12, 19 as it is generated via the HER. According to some aspects, the second layer of carbon component 17 may be provided a second distance d2 from the second surface 16, wherein distance d2 is sized such that hydrogen is able diffuse from the second surface 16 of the catalytic component 12 as it is generated via the HER, as described herein. Distance d2 may be the same or different from distance d1.

According to some aspects, distance d1 and/or distance d2 may result from the one or more forces maintaining the carbon component in its position relative to the catalytic component. For example, the catalytic component and the carbon component may be at least partially maintained in their positions relative one another by one or more chemical interactions, and in particular, by van der Waals forces. It should be understood that van der Waals forces comprise forces provided by the attraction and repulsion between atoms, molecules, and/or surfaces, such as the attraction and repulsion between atoms, molecules, and/or surfaces comprised by the carbon component and the catalytic component.

The method may comprise contacting the catalyst as described herein with a proton source such that protons traverse the plurality of pores and adsorb to the catalytic component at the catalytic sites. According to some aspects, the proton source may comprise water with or without additives. As used herein, the term "additive" refers to a substance contained by the proton source at a concentration of less than 50% w/v. Example additives include, but are not limited to, detergents, such as sodium dodecyl sulfate. It should be understood that the catalyst as described herein is configured such that, after protons traverse the plurality of pores and adsorb to the catalytic sites of the catalytic component, they may combine with electrons transmitted by the catalytic component to form hydrogen atoms. According to some aspects, two hydrogen atoms may combine to form molecular hydrogen via associative desorption from the catalytic sites of the catalytic component. It should be understood that this adsorption, formation of hydrogen, and/or associative desorption may be collectively referred to herein as the HER.

It is believed that the rate of the HER may be determined by a rate determining step selected from the adsorption of protons to the catalytic sites of the catalytic component and the associative desorption of molecular hydrogen from the catalytic component. According to some aspects, the catalyst as described herein is configured to enhance the rate of the HER by lowering the energy required by the rate determining step. For example, in the case wherein the rate determining step is the associative desorption of molecular hydrogen from the catalytic component, the catalyst as described herein may be configured to reduce the adsorption energy between hydrogen and the catalytic component at least in part due to the presence of the carbon component. In this way, the catalytic efficiency of the catalyst may be enhanced as compared with the catalytic efficiency of other known catalysts used for the HER, such as catalysts containing the catalytic component without the carbon component.

The present disclosure is also directed to a catalyst as described herein.

For example, the catalyst may comprise a catalytic component having at least a first surface comprising one or more catalytic sites as described herein and a carbon component provided as a layer on at least the first surface. As described herein, the carbon component may have a plurality of pores configured to enable passage of protons from a proton source through the carbon component to at least the first surface of the catalytic component so that the HER may take place at the one or more catalytic sites. As described herein, the carbon component may be provided a certain distance from the first surface of the catalytic component, the distance being sized so as to enable the presence and/or passage of hydrogen in the space between the carbon component and the catalytic component.

The present disclosure is also directed to methods of making the catalyst as described herein. According to some aspects, the method comprises providing a catalytic component as described herein and forming a carbon component thereon as described herein. It should be understood that providing the catalytic component may comprise any method for preparing a catalytic component as described herein that is suitable for use with the present disclosure. For example, U.S. Pat. No. 8,163,263, incorporated by reference herein in its entirety, describes methods for providing supported catalyst nanoparticles, which may be used for providing the catalytic component as described herein. In another example, U.S. Pat. No. 6,974,492, incorporated by reference herein in its entirety, describes methods for producing metal nanoparticles, which may be used for providing the catalytic component as described herein.

According to some aspects, forming the carbon component on the catalytic component may comprise providing the carbon component as a sub-coverage layer or providing the carbon component as a sub- or full-coverage layer and subsequently providing a plurality of pores as described herein.

According to some aspects, providing the carbon component as a full-coverage layer may be performed using the methods disclosed in U.S. Pat. No. 10,273,574, which is incorporated by reference herein in its entirety. According to some aspects, providing the carbon component as a sub-coverage layer may be performed by varying, for example, the rate of carbon source introduction, growth temperature, or a combination thereof, as described herein.

According to some aspects, subsequently providing a plurality of pores as described herein may be performed by applying a shadow mask to the formed carbon component and separating the carbon component from the catalytic component in order to provide one or more pores. Additionally or alternatively, subsequently providing a plurality of pores as described herein may be performed by etching the formed carbon component with an etching agent in order to provide one or more pores. Example etching agents include, but are not limited to, water, oxygen, and a combination thereof.

This detailed description uses examples to present the disclosure, including the preferred aspects and variations, and also to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

What is claimed is:

1. A catalyst for hydrogen generation, the catalyst comprising:
    a catalytic component having a first surface, the first surface comprising a plurality of catalytic sites, wherein the catalytic component consists of nickel, and
    a carbon component provided as a layer on the first surface, wherein the carbon component comprises a plurality of pores,
    wherein the carbon component interacts with the first surface via forces such that the carbon component is provided a first distance from the first surface,
    wherein the first distance is sufficient for a presence or passage of hydrogen between the catalytic component and the carbon component, and
    wherein the carbon component consists of graphene.

2. The catalyst according to claim 1, wherein the catalytic component is provided in a form selected from the group consisting of a particle and a sheet.

3. The catalyst according to claim 1, wherein the plurality of pores are configured for at least one proton to traverse therethrough.

4. The catalyst according to claim 1, wherein the carbon component is provided as discrete islands of graphene.

5. The catalyst according to claim 1, wherein the layer of carbon component on the first surface of the catalytic component provides a degree of coverage of less than 1 L of Langmuir.

6. A method for generating hydrogen, the method comprising contacting the catalyst according to claim 1 with a proton source.

7. The method according to claim 6, wherein the catalytic component is provided in a form selected from the group consisting of a particle and a sheet.

8. The method according to claim 6, wherein the plurality of pores are configured for at least one proton to traverse therethrough.

9. A method for preparing the catalyst according to claim 1, the method comprising:
providing the catalytic component having the first surface, and
forming the carbon component on the first surface.

10. A method for preparing the catalyst according to claim 1, the method comprising:
providing the catalytic component having the first surface,
providing a full-coverage layer of the carbon component on the first surface, and
creating one or more pores in the full-coverage layer such that the carbon component comprises the plurality of pores.

11. The method according to claim 10, wherein creating the one or more pores in the full-coverage layer comprises applying a shadow mask to the full-coverage layer and separating a portion of the full-coverage layer from the catalytic component to provide the one or more pores.

12. The method according to claim 10, wherein creating the one or more pores in the full-coverage layer comprises etching the full-coverage layer with an etching agent to provide the one or more pores.

* * * * *